No. 882,766. PATENTED MAR. 24, 1908.
T. E. MITCHELL & T. H. TOMBYLL.
DECORTICATING APPARATUS.
APPLICATION FILED JULY 19, 1906.
6 SHEETS—SHEET 3.

No. 882,766. PATENTED MAR. 24, 1908.
T. E. MITCHELL & T. H. TOMBYLL.
DECORTICATING APPARATUS.
APPLICATION FILED JULY 19, 1906.

UNITED STATES PATENT OFFICE.

THOMAS EDWARD MITCHELL AND THOMAS HANSEN TOMBYLL, OF MONTREAL, QUEBEC, CANADA, ASSIGNORS TO LOUIS OVIDE GROTHE, TRUSTEE, OF MONTREAL, CANADA.

DECORTICATING APPARATUS.

No. 882,766.

Specification of Letters Patent. Patented March 24, 1908.

Application filed July 19, 1906. Serial No. 326,950.

*To all whom it may concern:*

Be it known that we, THOMAS EDWARD MITCHELL and THOMAS HANSEN TOMBYLL, both of the city of Montreal, Province of Quebec, Canada, have invented certain new and useful Improvements in Decorticating Apparatus; and we do hereby declare that the following is a full, clear, and exact description of the same.

Our invention has particular reference to the decorticating of flax and producing of a flax fiber sliver, and may be said to consist in splitting longitudinally the fibrous bark of flax whether in a retted or a raw unretted condition and simultaneously breaking the woody matter of such flax and loosening the same from the bark, then straightening, drawing and scraping the flax and thereby expelling the woody matter, and finally condensing the fibrous bark into a sliver.

In order to carry out our improved process we have devised an apparatus comprising feeding mechanism and a plurality of groups of fluted rolls alternating with a plurality of pairs of scraping and drawing and straightening devices and arranged in sequence which terminates in a device for condensing into a sliver the flax fibers after having passed through the said groups of rolls and pairs of scraping, drawing and straightening devices the said rolls and scraping and drawing and straightening devices having a progressively increased speed of action throughout the sequence from the apron to the condensing device.

For full comprehension, however, of our invention reference must be had to the accompanying drawings forming a part of this specification, in which similar reference characters indicate the same parts and wherein.

The feeding mechanism comprises two aprons $a$ and $a'$ arranged in tandem and each having combing pins $a^2$, and a pair of fluted compressing rollers $a^3$ $a^4$ located between the said aprons and serving to draw out or elongate the mass of flax, while a series of preferably three skeleton rolls $e$ are provided, one located over the forward end of the apron $a$ and the other two being located over the opposite ends of the apron $a'$. This feeding mechanism feeds the raw unretted flax to the first group of fluted rollers (to be presently described) the rollers $a^3$ $a^4$ having a peripheral speed higher than apron $a$ and the apron $a'$ having a surface speed higher than the said speed of the rollers, while the skeleton rolls are driven by the aprons, the combing pins $a^2$ intermeshing therewith and these aprons and skeleton rollers coacting to supply the said raw unretted flax in a slightly crushed and elongated and straightened state to the first group of fluted rolls $e$ having a peripheral speed greater than the apron $a'$ and serving to further elongate the mass and longitudinally split the bark of the flax and break up the woody matter or shive and loosen the latter from the bark and at the same time crush the pods and liberate the flax seed. The function of the skeleton rolls at the forward ends of the aprons is to hold the flax upon the pins and retards or holds back every straw until it is actually taken by the fluted rolls, whether the intermediate fluted rolls (between the apron) or those of the first group, and the function of the skeleton roll at the rear of the apron $a'$ is to augment the said apron $a'$ in taking the mass from the said intermediate rolls and consequently in elongating and straightening the stems or straws thereof.

A pair of endless webs traveling at a preferably slightly higher speed than the fluted rolls and each comprising a plurality of spaced bars mounted upon endless belts $g$ (the bars of the upper web being indicated at $h$ and of the lower web at $i$) and the bars of one belt interdigitating with the bars of the other, take the crushed flax from the said fluted rolls and owing to the accelerated speed of such bars they progressively compress and scrape the flax and consequently exert a successive expulsive action upon the woody matter and, simultaneously elongate the mass and straighten the fibers. A second group of fluted rolls, $k$, each having a greater number of flutes than the rolls of the first group and traveling at a preferably, slightly higher peripheral speed than the webs, take the partially cleaned flax from the latter and further cleanse it of shive and seeds; and the flax is then acted upon in turn by a second pair of endless webs ($m$ and $n$) of scraping bars traveling at a higher speed than the second group of fluted rolls, a third group of fluted rolls $o$ with a greater number of flutes for the same diameter than the second group and rotating with a peripheral speed greater than the speed at which the second pair of webs travel, a third pair of webs $r$ and $s$ traveling at a greater speed than the third group of rolls and a fourth group of fluted rolls $t$ with a greater number of flutes for the same diameter than the third group and rotating with a peripheral speed greater than the last pair of webs. The flax owing to the alternate crushing and compressing and elongating and straightening emerges from the last group of rolls in a thoroughly cleansed state, and owing to the elongating and straightening action has its fibers drawn out and to a certain extent loosened from one another, and it is delivered in this state upon an inclined table $u$ having downwardly converging concaved walls $v$ terminating at a pair of smooth delivery rollers $w$ $w'$ which finally deliver the raw unretted flax fibers (condensed by the walls $v$) in the form of a sliver.

Figure 1:
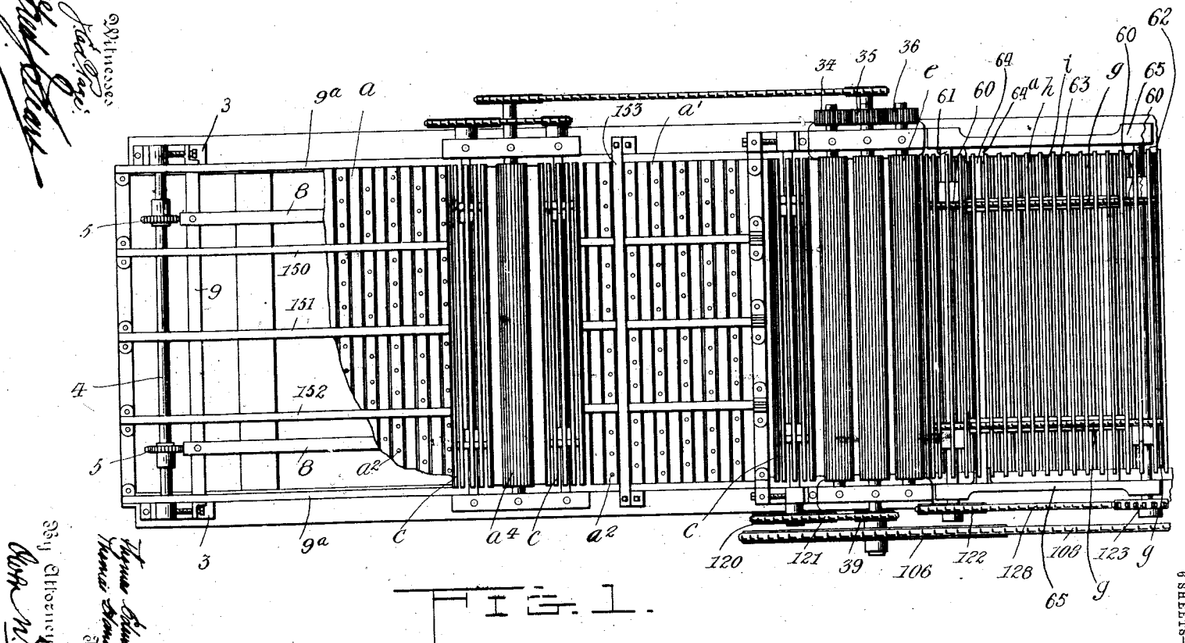
Figure 1 is a plan view of one half of our improved apparatus including the feeding end.
Figure 2:
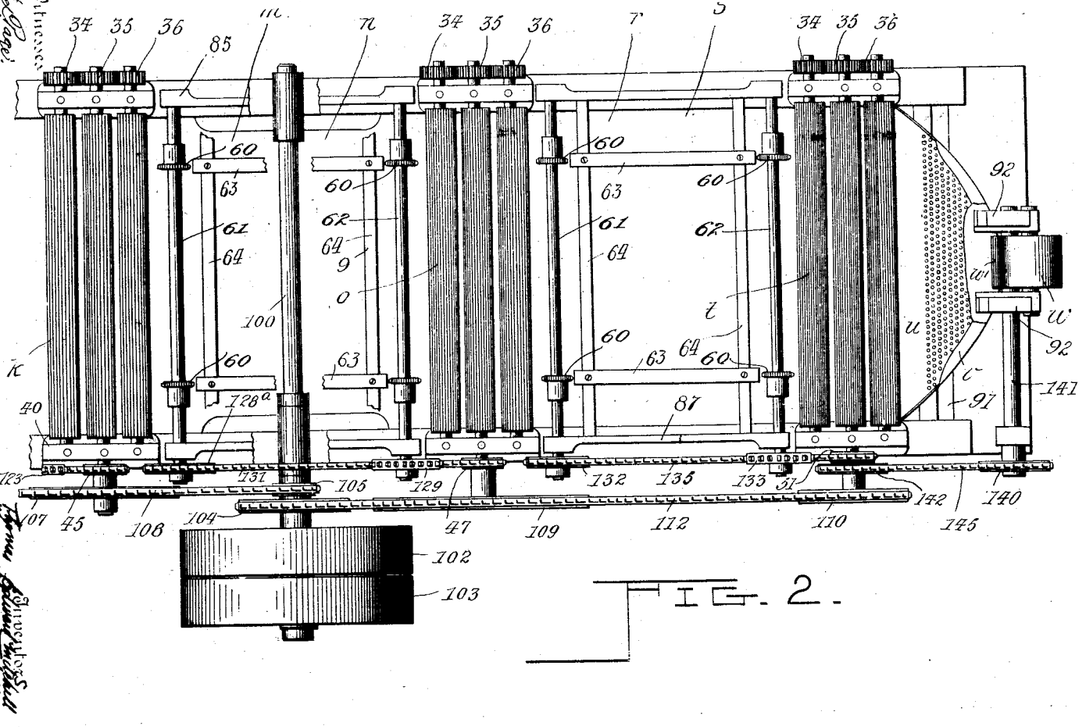
Fig. 2 is a similar view of the other half including the delivery end.
Figure 3:
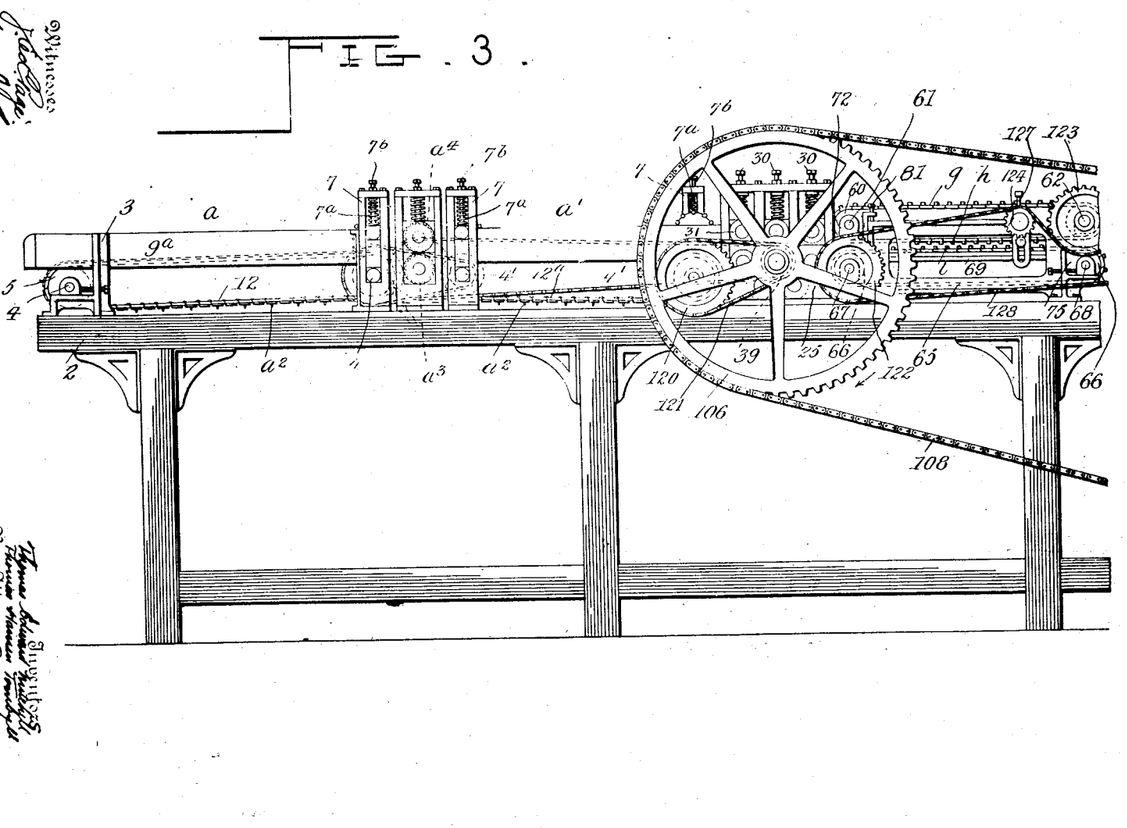
Fig. 3 is a side elevation of the portion of the apparatus illustrated in Fig. 1.
Figure 4:
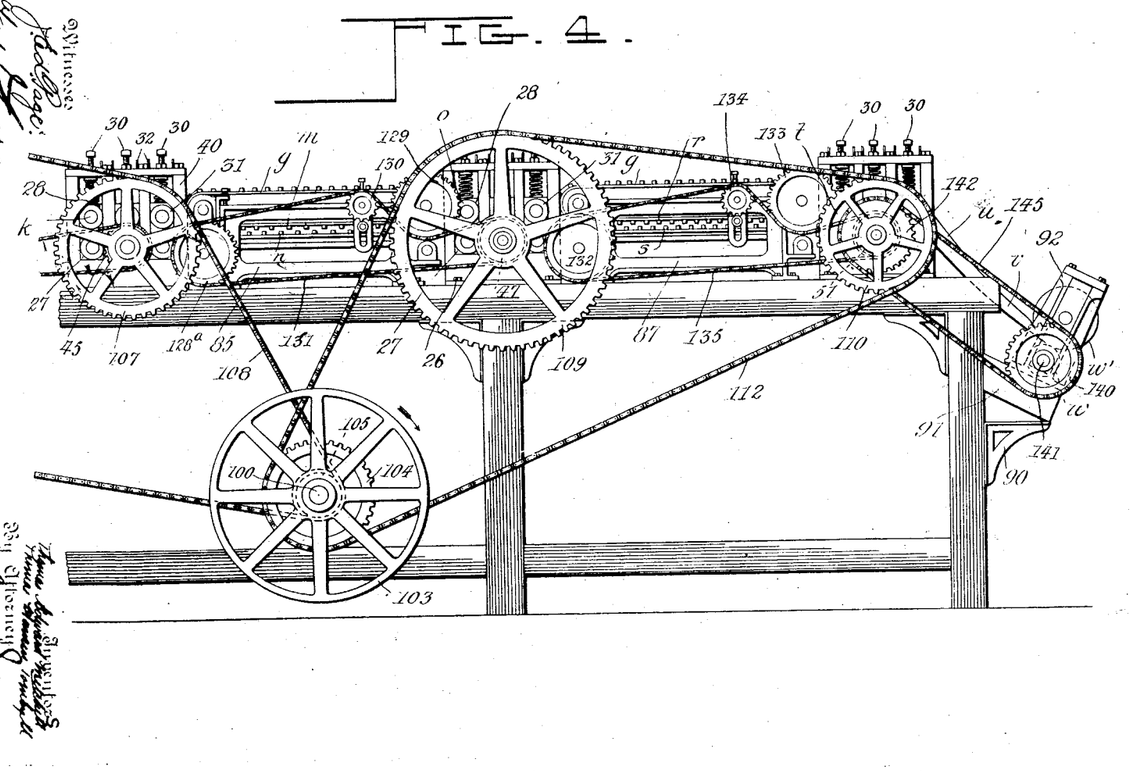
Fig. 4 is a side elevation of the portion of the apparatus illustrated in Fig. 2.
Figure 5:
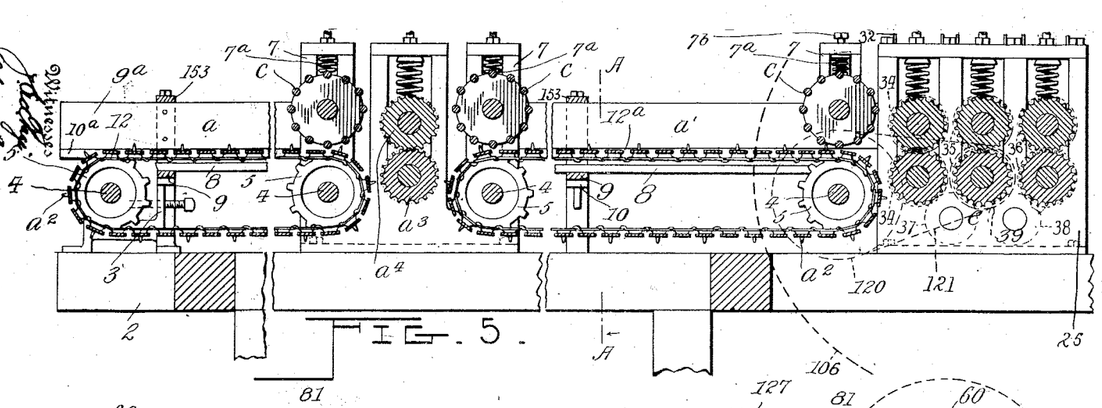
Fig. 5 is an enlarged longitudinal sectional view of the feeding device and the first group of rolls.
Figure 8:
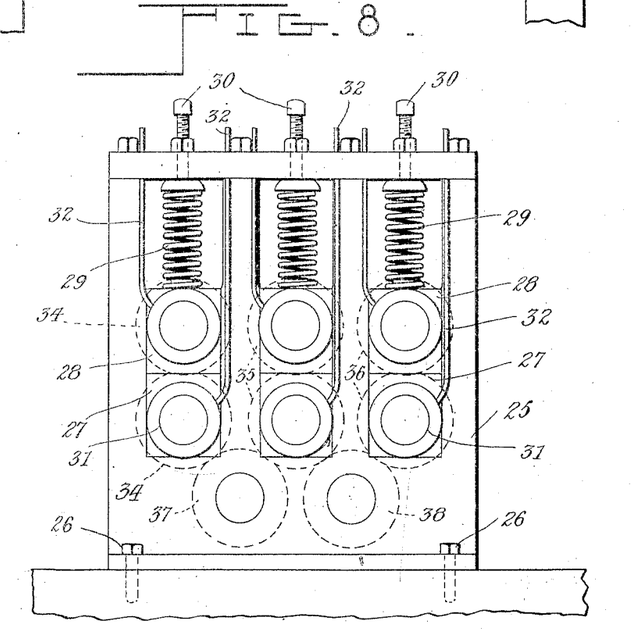
Fig. 8 is a detail side elevation of the housing of one of the groups of rolls.

The preferred manner of mounting the several operative elements of the apparatus and the preferred arrangement of the parts are as follows:—A main frame 2 supports a feeding frame 3 in which are mounted two pairs of shafts 4 and 4' with the apron carrying-sprocket wheels 5 supported rigidly thereon (see Fig. 5), the pair of intermediate fluted rollers $a^3$ $a^4$, and the three skeleton presser rolls $c$, the latter being supported in vertically elongated bearing brackets 7 in which they are free to be lifted by the mass as it passes, the said skeleton rolls being yieldingly maintained in bearing position by preferably light springs 7$^a$. A pair of chain guiding bars 8 are carried by transverse supporting bars 9 resting in turn on brackets 10 cast in this feeding frame in line with and slightly below the top of the sprocket wheels and a pair of horizontal side boards 9$^a$ rabbeted as at 10$^a$ are supported with their rabbets in a plane at the level of the top of the feeding aprons. Two pairs of endless chains 12 and 12$^a$ are looped around the sprocket wheels 5 in a manner to constitute supports for the aprons $a$ and $a'$ and their uppermost portions are supported upon the guiding bars 8 while the plurality of transverse slats constituting the said aprons $a$, $a'$, before mentioned, are secured rigidly to such chains and each alternate one carries the series of pins $a^2$ which multifarious series of pins are disposed in staggered relation in the direction of travel of the apron, the ends of such slats during the operation of the machine entering and traveling along the rabbets of the side boards as they assume their carrying position. The skeleton presser rolls $c$ as before mentioned bear lightly upon the surface of the apron and the pressure thereof may be varied by adjusting screws 7$^b$. Next to the delivery end of this feeding and initial progressive compressing and elongating mechanism a pair of housings 25 Fig. 8 are bolted as at 26 to the main frame. A number of these housings are employed to support the various sets of rolls and as all of the said housings are of the same construction I will describe one only. The housing has mounted therein three pairs of bearing blocks made up of three stationary blocks 27 and three superimposed vertically movable blocks 28 the latter being caused by springs 29 and set screws 30 to bear yieldingly with variable tension upon the former, while these blocks are provided with Babbitt bushings 31 lubricated through oil tubes 32. The first group of rolls $e$ are made up in this embodiment of our invention of six rolls and they are mounted in the said bearing blocks and each has preferably thirty-three flutes while they are driven by three pairs of gears 34, 35, and 36 respectively, those of each pair intermeshing with one another but being separated from the gears of the other pairs, and an intermediate pinion 37 connects the pair 34 to the pair 35 and a second intermediate pinion 38 connects the pair 35 to the pair 36 thus causing rotation imparted to the lowermost roll 35 (by sprocket wheel 39, Fig. 1, to be hereinafter alluded to) in the direction indicated (Fig. 3) to be transmitted to the lowermost rolls of the pairs 34 and 36, and effecting a continuous feed movement from the apron through this series of fluted rolls. A second pair of similar housing 40 supporting the second group of rolls $k$ having preferably fifty-five flutes each and mounted similarly to the group $e$ and driven by a sprocket wheel 45 are located a distance from this first group greater than the longest fiber of flax; the third group $o$ of rolls have preferably eighty-two flutes in each, and are mounted similarly to the groups $e$, and $k$ and driven by a sprocket wheel 47, this third group being also located a distance from the second group greater than the longest fiber of flax; and the rolls of the fourth group $t$ have preferably ninety-nine flutes in each and are mounted similarly to groups $e$, $k$ and $o$ and driven by a sprocket wheel 51, such fourth group being located at the delivery end of the apparatus and at a distance from the third group similar to that separating the third from the second.

Figure 6:
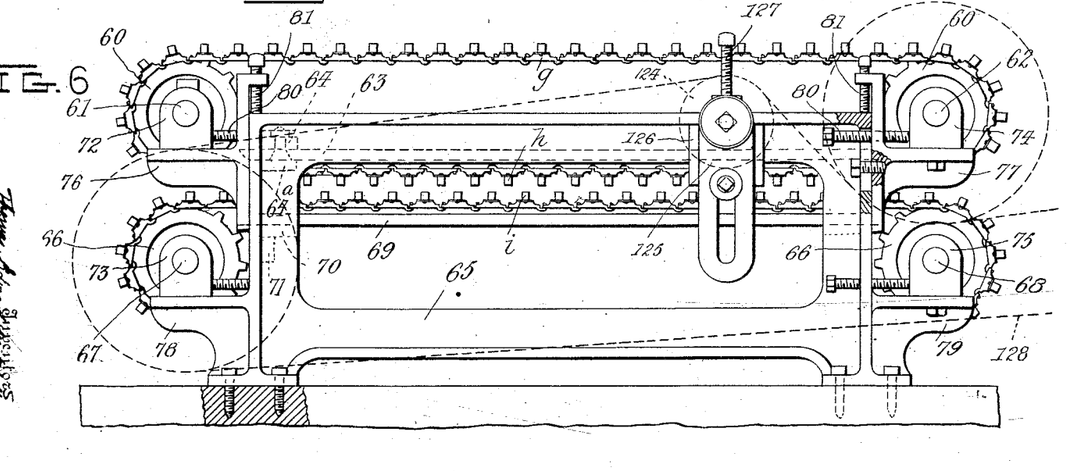
Fig. 6 is an enlarged side elevation, partly in section, of one of the web carrying frames.
Figure 7:
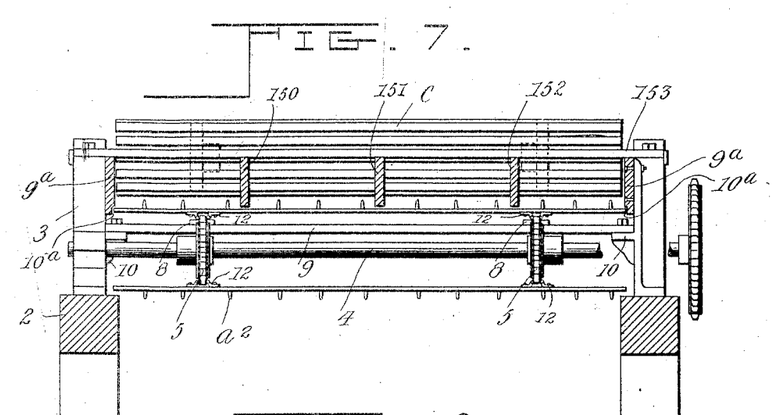
Fig. 7 is a transverse sectional view taken on line A, A, Fig. 5.

The upper web $h$ (Fig. 3) has its endless carrying belts $g$ (which are in the form of chains) looped over sprocket wheels 60 mounted rigidly upon a pair of shafts 61 and 62 in line with guide bars 63 supported by a pair of guide bearers 64 bolted to brackets 64ª upon a supporting frame 65. The lower web $i$ (of similar construction to the web $h$) is looped over sprocket wheels 66 mounted upon shafts 67 and 68 and in line with a pair of guide-bars 69 supported by a pair of guide bearers 70 bolted to brackets 71 upon the said web-supporting frame. The shafts 61, 62, 67 and 68 are mounted in bearings 72, 73, 74 and 75 Fig. 6 carried by brackets 76, 77, 78 and 79, respectively, the bearings 73 and 75 being adjustable horizontally upon their brackets, by means of screws 80, for the purpose of tightening the webs, and the brackets 76 and 77 being adjustable vertically by means of screws 81 for the purpose of setting the upper web relatively to the lower web and varying the extent of interdigitation. This web-supporting frame 65 with its webs $h$ and $i$ is located between the first and second groups of fluted rolls; a second frame 85 supporting the second pair of webs $m$ and $n$ in precisely the same manner and with the same arrangement as the webs $h$ and $i$, being located between the second and third groups of fluted rolls; and a third frame 87 also similar in all respects to the frame 65 and supporting the third pair of webs $r$ and $s$, is located between the third and fourth groups of fluted rolls.

The table $u$ of the condensing device is secured in any preferred manner to the end of the main frame and is supported partially by a bracket 90 and a transverse inclined sill 91 to which the lower end of the table is rigidly secured and upon which a pair of housings 92 are bolted, the latter carrying the condensing and delivering rolls $w$ and $w'$ the uppermost of which is of larger diameter than the lower.

We prefer to use a chain drive for our apparatus although other driving gear may be utilized if desired without departing from the spirit of our invention. The chain drive we employ is driven from a main driving shaft 100 mounted in any suitable bearings not shown and having mounted thereon tight and loose pulleys 102 and 103 and large and small sprocket wheels 104, 105 having preferably twenty-one and eight teeth respectively, a sprocket wheel 106 with, preferably, forty-nine teeth being mounted upon the same shaft as the sprocket wheel 39 which has, preferably, ten teeth of smaller pitch, and a sprocket wheel 107, having, preferably, twenty-eight teeth is mounted upon the same shaft as the sprocket wheel 45 which has fourteen teeth of the same pitch as wheel 39, while an endless chain 108 is looped around the said sprocket wheels 105, 106 and 107. A sprocket wheel 109 having, preferably forty-one teeth is mounted upon the same shaft as sprocket wheel 47 which has, preferably, fourteen teeth of the same pitch as wheels 39 and 45, a sprocket wheel 110, having preferably twenty-one teeth being mounted upon the same shaft as sprocket wheel 51 which has also twenty-one teeth but of the same pitch as the teeth of wheels 39, 45 and 47, which as before mentioned is smaller, and an endless chain 112 is looped around the sprocket-wheels 104, 109 and 110.

The driving gear as thus far described imparts different speeds from the main driving shaft to the four groups of rollers the first group having the lowest speed and the second third and fourth increasing progressively in their numerical order, and the first group imparts a lower speed than that at which the peripheries of its members travel to the feeding apron and each of the other groups performs a like function in relation to the webs following them. This is effected by a sprocket wheel 120 having, preferably, eighteen teeth (of the same pitch as the teeth of the sprocket wheel 39) mounted upon shaft 4 nearest the first group of fluted rolls and an endless chain 121 looped over such sprocket wheels 120 and 39; a pair of sprocket wheels 122 and 123 each having preferably twenty-one teeth of the same pitch as the sprocket wheels 39 and 45, one being mounted upon the shaft 62 and the other upon the shaft 67 of the first pair of webs, a tension sprocket wheel 124 mounted in a block 125 vertically adjustably secured to the frame 65 by means of a guide 126 and a set screw 127, and an endless chain 128 looped around the said sprocket wheels 45, 122, 124 and 123; a pair of sprocket wheels 128ª and 129 corresponding in diameter and pitch of teeth to 122 and 123 are mounted upon the shafts, of the second pair of webs, corresponding to shafts 62 and 67 of the first pair and a tension sprocket 130 is adjustably mounted similarly to the tension sprocket 124, and an endless chain 131 is looped around the sprocket wheels 47, 128ª, 130 and 129; and a corresponding pair of sprocket wheels 132 and 133 and tension sprocket wheel 134, are operatively connected to the third pair of webs and have an endless chain 135 looped around them and sprocket wheel 51 all in a similar manner to sprocket wheels 122, 123, and 128ª, 129 and chains 138 and 131; while a sprocket wheel 140 having preferably twenty teeth is mounted upon a shaft 141 upon which roll $w$ is mounted and is operatively connected to a sprocket wheel 142 (having preferably twenty-one teeth, and mounted upon the same shaft as sprocket wheels 51 and 110) by an endless chain 145.

In order to prevent the flax bunching on the feeding apron a series of preferably three division boards 150, 151, 152 are supported longitudinally of the apron and with their lower edges in close proximity to the surface thereof by transverse carrier bars 153 supported in turn upon the sides of the feed frame. These division boards may be dispensed with if desired without departing from the spirit of our invention.

The operation of the apparatus is briefly as follows:—The raw unretted flax is thrown upon the apron, a, and owing to the higher speed of the member a' is straightened by the combing pins a' and it is then fed by the said member a' of the apron, assisted by the presser roll c, to the first group of fluted rolls the increased peripheral speed of which exerts a drawing action upon the flax, while the intermeshing of the ribs formed by the flutings breaks the woody matter into small pieces and splits the bark longitudinally. As the split and broken matter begins to issue from this group of rolls it is acted upon by the first pair of scraping and drawing and straightening webs which subject it to a compression progressing from such rolls and thereby expelling the woody matter and at the same time lengthening the mass by drawing the flax fibers released from those held by the said rolls until those held are released when they in turn will be drawn from those following and held by the rolls, and in this manner the bark is partially cleansed of the woody matter and the fibers are loosened to a certain extent from each other. As the mass leaves the first pair of webs it is taken by the second group of rolls and, owing to the increased speed of the latter, a further progressive compressing action is exerted with a resultant expulsion of hard substances and simultaneously the intermeshing of the ribs between the flutings further break up the woody matter and loose it from the bark. The flax is then taken by the second pair of webs which, owing to their increased speed, further progressively compress it and, consequently cleanse it still more; the third group of rolls, third pair of webs and fourth group of rolls then successively take it and alternately break the woody matter and expel it from the bark and in each instance split the bark more and more and loosen and separate the long fibers thus produced from each other to a continually increasing extent until it is finally fed upon the condensing table in a loose hair-like long fibrous mass which is delivered in the form of a sliver.

Although we have described our apparatus as applied to the decortication of raw unretted flax it can also be applied with advantage to retted flax or other fibrous substances within the spirit of our invention.

What we claim is as follows:

1. In an apparatus for decorticating flax and the like the combination with means for simultaneously feeding and combing the flax, of a pair of parallel traveling crushing or breaking members with their adjacent sides moving in the same direction and presenting a plurality of axial edges, a pair of parallel traveling stripping members with their adjacent sides moving in the same direction and presenting a plurality of axial edges, stripping members having a greater speed than the crushing or breaking members for the purpose of expelling the woody matter from the flax and the like, the stripping members being in close contiguity to the crushing or breaking members and receiving the flax or the like directly therefrom, and the first mentioned pair of parallel traveling crushing or breaking members being in close contiguity to and receiving the combed flax directly from the feeding and combing means.

2. A decorticating apparatus consisting of a sequence comprising a feeding and combing device, a series of groups of axially corrugated rolls, a series of pairs of webs presenting a plurality of transverse projecting edges and the edges of one of the webs of each pair being intercurrent with the edges of the other, the said groups of rolls and pairs of webs alternating and being in close contiguity and in direct communication with one another and the first member of the said series being in direct communication with the combing and feeding device.

3. A decorticating apparatus consisting of a sequence comprising a feeding and combing device, a series of groups of axially corrugated rolls, a series of pairs of webs presenting a plurality of transverse projecting edges and the edges of one of each pair being intercurrent with the edges of the other, the said groups of rolls and pairs of webs alternating and being in close contiguity and in direct communication with one another, each group and pair traveling at a greater speed than the group or pair following it and the first member of the said series being in direct communication with the combing and straightening device.

4. A decorticating apparatus consisting of a sequence comprising a series of groups of axially corrugated rolls a series of pairs of webs presenting a plurality of transverse projecting edges and the edges of one of the webs of each pair interdigitating with the edges of the other, the said groups of rolls and pairs of webs alternating and being in close contiguity and in direct communication with one another, and means for condensing the decorticated matter into a sliver.

5. A decorticating apparatus consisting of a sequence comprising a series of groups of axially corrugated rolls, a series of pairs of webs presenting a plurality of transverse projecting edges and the edges of one of each pair interdigitating with the edges of the other, the said groups of rolls and pairs of webs alternating and being in close contiguity and in direct communication with one another, each group and pair traveling at a greater speed than the group or pair following it, and means for condensing the decorticated matter into a sliver.

6. In combination, a feed device; a group of fluted rolls in close proximity to the delivery end of the feed device; a pair of coacting traveling webs in close proximity to the rolls and each made up of a plurality of bars extending at an angle to their direction of travel means connecting the bars flexibly together and means supporting the said webs; a condensing device in sequence with the rolls and webs, and means whereby the rolls are caused to travel at a greater speed than the feed device and the webs at a greater speed than the rolls.

7. In combination, a feed device; a series of groups of fluted rolls the first of which is in close proximity to the delivery end of the feed device; a series of pairs of coacting traveling webs the first of which is in close proximity to the said first group of rolls each of said webs being made up of the plurality of bars extending at an angle to their direction of travel means connecting the bars flexibly together and means supporting the said webs; the other groups of the series alternating with the other pairs of webs in a sequence terminating in a group of rolls, a condensing device in close proximity to the said last mentioned group of rolls, and means whereby each member of the sequences is caused to travel at a greater speed than the member following the same.

In testimony, we have signed our names to this specification, in the presence of two subscribing witnesses.

THOMAS EDWARD MITCHELL.
THOMAS HANSEN TOMBYLL.

Witnesses:
WILLIAM B. McFEAT,
ARTHUR H. EVANS.